United States Patent [19]

Kulander

[11] Patent Number: 4,715,838

[45] Date of Patent: Dec. 29, 1987

[54] APPARATUS FOR RECOVERING FLUORESCENT MATERIAL FROM MERCURY VAPOR DISCHARGE LAMPS

[75] Inventor: Hans Kulander, Oskarshamn, Sweden

[73] Assignee: MRT System Aktiebolag, Oskarshamn, Sweden

[21] Appl. No.: 853,127

[22] Filed: Apr. 17, 1986

[30] Foreign Application Priority Data

Apr. 30, 1985 [SE] Sweden ................................ 8502103

[51] Int. Cl.$^4$ ............................ H01J 9/00; A47L 7/00
[52] U.S. Cl. ........................................ 445/61; 15/304
[58] Field of Search ................. 445/2, 59, 61; 15/406, 15/304; 225/2, 93.5

[56] References Cited

U.S. PATENT DOCUMENTS

| 2,116,129 | 5/1938 | Stringer | 225/93.5 |
| 2,122,117 | 6/1938 | Stringer | 445/2 |
| 2,267,435 | 12/1941 | Thomas | 15/304 |
| 2,669,217 | 2/1954 | Pearson | 15/304 X |
| 3,679,284 | 7/1972 | Thall | 445/2 |
| 4,268,306 | 5/1981 | Bjorkman | 75/81 |

FOREIGN PATENT DOCUMENTS 33387  3/1977  Japan ................................ 445/2
56257  5/1979  Japan ................................ 15/304
7804104  4/1979  Sweden .

Primary Examiner—Kenneth J. Ramsey
Attorney, Agent, or Firm—Frishauf, Holtz, Goodman & Woodward

[57] ABSTRACT

A method and apparatus for recovering the luminescent material from a mercury vapor electric discharge lamp, or like lamps, in which the ends of the lamp bulb or tube are separated from the intermediate bulb part (22) subsequent to equalizing the pressure in the lamp. The luminescent material (30) is loosened from the inner wall surface of the bulb part (22) with the aid of a stripping device (27) which is arranged to be inserted into the bulb part (22) from one end (26) thereof, and in which the loosened material is collected with the aid of a suction device (25) connected to the other end (23) of the bulb part. The stripping device (27) comprises a stripping head (29) mounted on one end of a rod (28). The rod (28) is arranged to move the stripping head (29) backwards and forwards in the bulb part (22), the stripping head (29) being guided in a manner to form an annular gap between the head and the wall of the bulb part. The luminescent material is loosened by the amplified air stream created by the suction device (25), passing through the gap.

11 Claims, 7 Drawing Figures

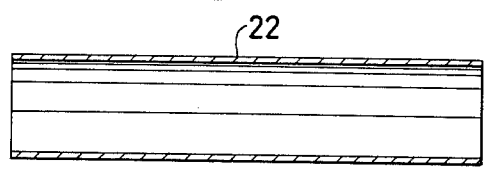
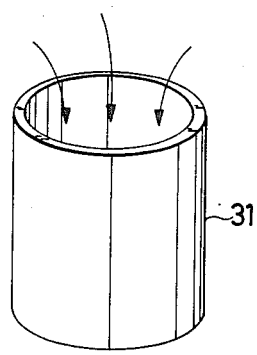
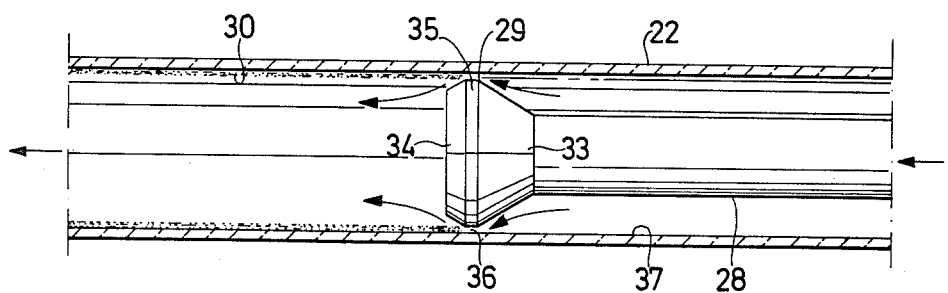

APPARATUS FOR RECOVERING FLUORESCENT MATERIAL FROM MERCURY VAPOR DISCHARGE LAMPS

BACKGROUND OF THE INVENTION

The present invention relates to a method for recovering fluorescent material from mercury vapour discharge lamps or the like, and to an arrangement for removing and collecting the fluorescent material.

Mercury is a necessary constituent of the fluorescent layer in mercury vapour discharge lamps. Consequently, extended or burned-out lamps must be processed in a suitable manner, so that the fluorescent material has no harmful effect on surrounding fauna and flora. Originally, expended vapour discharge lamps were dumped in the countryside at convenient dumping locations, although this procedure is now normally forbidden by the authorities. Controlled storage within the vapour discharge lamp industry has also become troublesome, due to the large quantities of waste requiring handling and supervision. In accordance with one practical method proposed some years ago the expended or scrapped lamps are crushed into fragments, coated with luminescent material, and the fragments placed in a treatment vessel in which the mercury is recovered by distillation processes. This treatment is carried out batchwise in a sealed container, into which nitrogen gas is introduced, and the container heated and placed under vacuum, such as to vapourize the mercury, the vapourized mercury being removed from the container through a bottom outlet and condensed in a cooling trap. This method is described and illustrated in Swedish Published Specification No. 7804104-3 (corresponding to U.S. Pat. No. 4,268,307). However, although the mercury is separated very efficiently, the process involved is extremely slow, taking about 9 hours to complete for each batch of 120 1, which renders the method expensive and therefore difficult to introduce in all destruction plants or in other establishments requiring to treat or process scrapped vapour discharge lamps.

SUMMARY OF THE INVENTION

Consequently, one object of the present invention is to provide a method for recovering the luminescent material from mercury vapour electric discharge lamps, such that the amount of lamp waste requiring treatment in the distillation chamber can be reduced, and therewith increase the capacity of the chamber with respect to the number of lamps which can be treated in each calendar day. This object is achieved by removing the luminescent material or luminescent powder from the inner surface of the glass bulb of the lamp, and introducing the material thus separated into the distillation chamber, thereby obviating the need to fill the chamber with the residual "clean" glass bulb. A further object is to provide an arrangement for effectively removing and collecting the aforesaid luminescent powder. Other objects of the invention and advantages afforded thereby will be evident from the following description. These objects and advantages are achieved by the arrangement according to the invention having the characterizing features set forth in the following claims.

BRIEF DESCRIPTION OF THE DRAWINGS

FIG. 5 illustrates the intermediate bulb part shown in FIG. 4, with the luminescent material removed therefrom;

FIG. 6 illustrates a mercury distillation vessel; and

FIG. 7 is an enlarged view of the bulb or tube section illustrated in FIG. 4.

DETAILED DESCRIPTION

Figure 1:
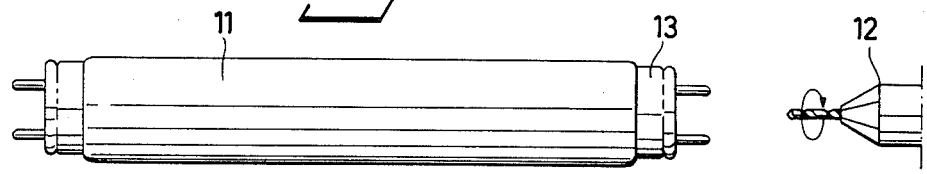
FIGS. 1-3 are respective side views of the bulb section of a mercury vapour electric discharge lamp, and illustrates schematically the initial stages of a method according to the invention.
Figure 2:
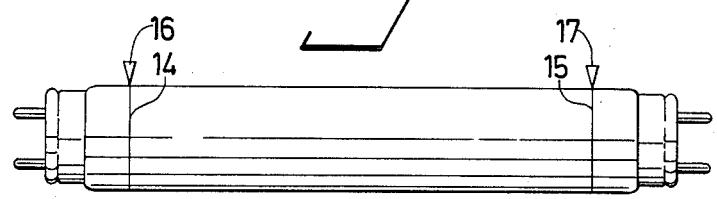
Figure 3:
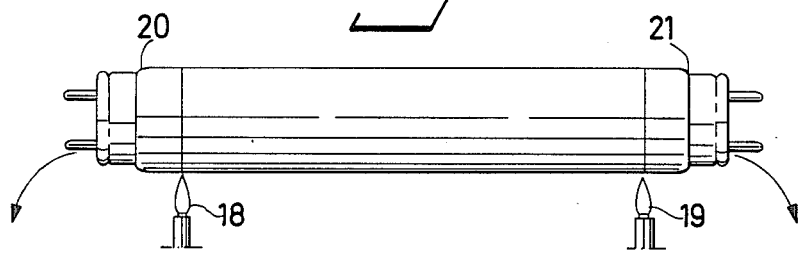
Figure 4:
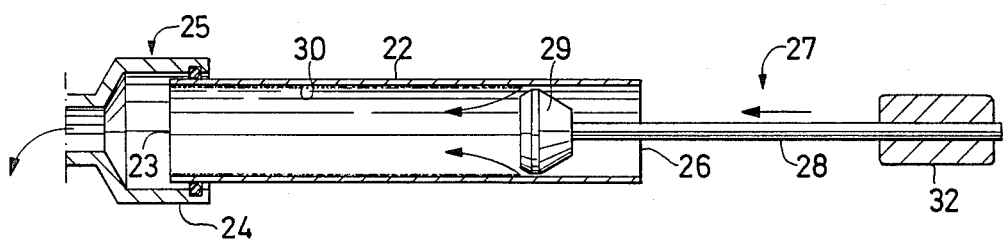
FIG. 4 is a schematic, longitudinal sectional view of the intermediate tubular part of the bulb or tube illustrated in FIGS. 1-3, and illustrates schematically an arrangement for loosening luminescent material from the intermediate bulb part.

Mercury vapour electric discharge lamps received for treatment in destruction plants and like centres are normally expended or burnt-out, but otherwise whole. The present invention is particularly aimed at the treatment of such lamps, and the various stages of an illustrative method according to the invention will now be described with reference to the schematic FIGS. 1-6.

(a) In order to avoid impletions, the lamp bulb or tube 11 is punctured, preferably by drilling a hole through the electrical contact element 13 located at one end of the bulb, with the aid of a drill 12.

(b) Score-lines 14,15 are scribed in respective ends of the bulb in some suitable manner, with the aid of knives 16, 17.

(c) The scored regions of the bulb are then rapidly heated with gas flames 18,19, to cause the glass to crack at said regions, thereby enabling the lamp ends 20,21 to be removed from the bulb or tube 11.

(d) One end 23 of the residual bulb part 22 is then connected to a nozzle 24 provided on a suitable suction device indicated at 25, although not shown in detail. A stripper device 27 is then inserted into the bulb part 22, through the other end 26 thereof, the illustrated stripper device having the form of a stripping head 29 which is carried on a rod 28 and guided in the bulb part 22 in a manner to form an air gap of only some tenths of a millimeter between a peripheral surface on the stripping head and the opposing wall of the bulb part 22. The luminescent powder 30 located on the wall of the bulb part 22 is removed therefrom with the aid of a suction effect created by an amplified air stream formed around the stripping head 29, and is collected in the suction device 25.

(e) The cleansed bulb part 11, no longer contaminated with mercury, is now removed and may be used again in a new vapour electric discharge lamp.

(f) The ends 20,21 of the lamp and the collected luminescent powder are now placed in a treatment chamber 31, for distillation of the mercury present in a known manner.

This method enables the bulb part 22 to be removed from the process prior to distillation, which means that ten times as much discharge-lamp waste material can be treated in comparison with processes in which the bulbs are first crushed and then cleansed of their luminescent content. In order for the improved process to be equally as effective as the known processes, however, it is necessary to ensure that substantially all the luminescent powder present is removed from the bulb by suction in step (d) of the aforedescribed method, i.e. that this suction step is substantially 100% effective. This can be achieved with the stripping device according to the invention, which need only be moved forwards and backwards once in the bulb part 22 in order to fulfil the aforesaid requirement.

As beforementioned, the illustrated stripping device 27 comprises a stripping head 29 carried on a rod 28, which is driven by a linear motor 32. The stripping head 29 has the configuration of a double-cone presenting two conical surfaces 33,34 (FIG. 7) each departing from a mutually common circular waist or centre section 35. The conical surfaces are inclined at an angle of 20°–40°, preferably 30°, for reasons hereinafter made apparent. The diameter of the waist section 35 is such as to form an air gap 36 of 0.1–0.3 mm, preferably 0.2 mm, between the peripheral surface of the waist section and the opposing glass wall 37 of the bulb part 11. The stripping head 39 and the rod 28 are conveniently made as light as possible. For example, the rod 28 may comprise thin-wall steel tubing, whereas the stripping head may be made of "Teflon" or some similar material. The lightness in weight of the stripping head and the supporting rod, together with the particular form thereof, enables the stripping head to float freely in the bulb part 22, so as to be self-centering therein. In addition hereto, the selected angles of the conical surfaces of the stripping head and the selected width of the gap 36 enable an extremely powerful stream of air to be drawn by suction through the gap, under the influence of the aforesaid suction device, with a relatively small power input. Practical tests have shown that a lamp bulb or tube having a length of 1.6 m and a diameter of 26 mm can be cleansed effectively with the aid of a conventional 650 W industrial vacuum cleaner. When carrying out these tests, it was found that 95% of the luminescent material is loosened on the forward stroke of the stripping head and 5% on its rearward stroke.

It will be understood that the invention is not limited to the described embodiment, and that modifications can be made within the scope of the following claims. For example, in certain cases the luminescent material can be re-used or dumped, instead of being treated in a distillation plant.

I claim:

1. Apparatus for removing and collecting luminescent material from mercury vapour electrical discharge lamps and like lamps, comprising:
   a stripping device (27) for loosening luminescent material (30) from inner wall surfaces of a bulb part (22) in conjunction with a suction force; and
   a suction device (25) including means connectable to one end of the bulb part (22) for generating said suction force in the bulb part and for collecting loosened luminescent material;
   said stripping device (25) including:
     a supporting rod (28) arranged for reciprocatory movement in the bulb part (22);
     a stripping head (29) mounted on one end of said rod (28) and arranged for reciprocatory movement in the bulb part (22) along with said rod (28);
     said stripping head (29) being supported and guided by said rod (28) in the bulb part (22), and being dimensional so as to define an annular air gap (36) between the outer periphery of said stripping head (29) and an opposing wall section of the bulb part (22), the size of said gap being such as to provide said suction force; and
     said stripping head (29) having a double-cone configuration presenting two conical surfaces (33, 34) each departing in opposite directions from a mutually common waist section (35), said conical surfaces having given cone angles so as to center said stripping head (29) in the bulb part (22) under the influence of said suction force.

2. The apparatus of claim 1, wherein the cone angle of said conical surface is 20°–40°, and said gap has a width of 0.1–0.3 mm.

3. The apparatus of claim 2, wherein the cone angle of said conical surface is 30°, and said gap has a width of 0.2 mm.

4. The apparatus of claim 1, wherein the cone angle of said conical surface is 20°–40°.

5. The apparatus of claim 4, wherein the cone angle of said conical surface is 30°.

6. The apparatus of claim 1, wherein said gap has a width of 0.1–0.3 mm.

7. The apparatus of claim 6, wherein said gap has a width of 0.2 mm.

8. The apparatus of claim 1, wherein said supporting rod (28) is substantially stiff.

9. The apparatus of claim 1, wherein said gap is defined between said common waist section (35) and an opposing wall section of the bulb part (22).

10. The apparatus of claim 9, wherein said gap has a width of 0.1–0.3 mm.

11. The apparatus of claim 10, wherein the cone angle of said conical surface is 20°–40°.

* * * * *